US006868925B2

(12) United States Patent
Trefz et al.

(10) Patent No.: US 6,868,925 B2
(45) Date of Patent: Mar. 22, 2005

(54) ENGINE WITH INTEGRAL ACTUATOR (75) Inventors: Harlin J. Trefz, Jackson, TN (US); Ted Wetzel, Mayfield, OH (US)

(73) Assignee: Delta Systems, Inc., Streetsboro, OH (US)

(*) Notice: Subject to any disclaimer, the term of this patent is extended or adjusted under 35 U.S.C. 154(b) by 256 days.

(21) Appl. No.: 10/008,036

(22) Filed: Nov. 5, 2001

(65) Prior Publication Data

US 2002/0038731 A1 Apr. 4, 2002

Related U.S. Application Data

(63) Continuation-in-part of application No. 09/618,697, filed on Jul. 18, 2000, now Pat. No. 6,543,560.

(51) Int. Cl.[7] .............................. B60K 17/28; F04B 1/00
(52) U.S. Cl. ........................ 180/53.4; 60/325; 60/477; 417/364; 123/198 C
(58) Field of Search ........................ 123/198 R, 198 C, 123/195 R; 60/325, 477; 180/53.1, 53.6, 53.7, 53.4; 417/364

(56) References Cited

U.S. PATENT DOCUMENTS

| 2,474,706 | A | | 6/1949 | Wahlmark |
| 2,977,764 | A | | 4/1961 | Matthews |
| 3,063,225 | A | | 11/1962 | Barrentine |
| 3,394,544 | A | | 7/1968 | Jackoboice |
| 3,627,351 | A | | 12/1971 | Zimmerman |
| RE27,307 | E | | 3/1972 | DeLallo |
| 3,739,578 | A | | 6/1973 | Roeske |
| 3,816,031 | A | * | 6/1974 | Joyce, Sr. .................... 417/364 |
| 3,875,746 | A | * | 4/1975 | Elliott .......................... 60/369 |
| 3,898,807 | A | | 8/1975 | Habiger |
| 3,986,358 | A | | 10/1976 | Hoffmann |
| 4,041,702 | A | | 8/1977 | Habiger |
| 4,041,703 | A | | 8/1977 | Knapp |
| 4,096,768 | A | | 6/1978 | Miyao |
| 4,114,586 | A | | 9/1978 | Fujikawa et al. |
| 4,145,883 | A | * | 3/1979 | Forster ........................ 60/458 |
| 4,167,855 | A | | 9/1979 | Knapp |
| 4,178,741 | A | | 12/1979 | Lonn et al. |
| 4,189,921 | A | | 2/1980 | Knapp |
| 4,300,872 | A | * | 11/1981 | Brown et al. ................ 417/360 |
| 4,344,742 | A | * | 8/1982 | Ferris .......................... 417/343 |
| RE31,049 | E | * | 10/1982 | Brian .......................... 417/343 |
| 4,368,609 | A | | 1/1983 | Hutchinson et al. |
| 4,480,968 | A | * | 11/1984 | Duerr .......................... 417/380 |
| 4,522,553 | A | | 6/1985 | Nelson et al. |

(List continued on next page.)

FOREIGN PATENT DOCUMENTS

EP          005355B A1    9/1982

OTHER PUBLICATIONS

John Deere 790 Compact Utility Tractor Advertisement, date unknown (1 page).
John Deere Compact Utility Tractor Service Manual (1991) pp. 255–15–3; 270–10–3; 70–10–7; 70–11–16; 270–05–7; 70–10–6; 270–10–37.
John Deere 4200, 4300 and 4400 Compact Utility Tractor Advertisement, date unknown (1 page).
John Deere 4200–4300–4400 Compact Utility Tractor Service Manual (2001, earlier versions of manual believed to exist) pp. 6–7; 8–18; 11–7 and 11–6.

Primary Examiner—Paul N. Dickson
Assistant Examiner—George D Spisich
(74) Attorney, Agent, or Firm—Watts Hoffmann Co., LPA (57) ABSTRACT

An engine with an integral actuator for a vehicle having an implement needing control. The engine includes a crank shaft, and a pump in a housing and an actuator that extends from the housing. The pump is operably connected to the crank shaft to produce a flow of fluid, such as oil, from the pump to the actuator. A valve is operably connected to the pump or the actuator to selectively move the actuator.

26 Claims, 10 Drawing Sheets

U.S. PATENT DOCUMENTS

| | | | |
|---|---|---|---|
| 4,541,229 A | | 9/1985 | Elijah |
| 4,599,861 A | * | 7/1986 | Beaumont .................... 60/595 |
| 4,613,024 A | | 9/1986 | Irikura et al. |
| 4,633,961 A | | 1/1987 | Niskamen |
| 4,643,442 A | | 2/1987 | Ohashi et al. |
| 4,669,361 A | | 6/1987 | Ito et al. |
| 4,673,055 A | | 6/1987 | Yamaoka et al. |
| 4,756,234 A | | 7/1988 | Anderson |
| 4,864,805 A | | 9/1989 | Hager et al. |
| 4,864,823 A | | 9/1989 | Ikejiri et al. |
| 4,878,338 A | | 11/1989 | Aldred et al. |
| 4,899,542 A | | 2/1990 | Iino et al. |
| 4,901,685 A | | 2/1990 | Fukuo et al. |
| 4,932,208 A | | 6/1990 | Koyama et al. |
| 4,942,852 A | | 7/1990 | Richeson et al. |
| 4,944,201 A | | 7/1990 | Iino et al. |
| 4,951,462 A | | 8/1990 | Graf |
| 4,969,319 A | | 11/1990 | Hutchison et al. |
| 4,974,400 A | | 12/1990 | Chubey et al. |
| 5,045,035 A | | 9/1991 | Ganoung |
| 5,048,273 A | | 9/1991 | Orsborn et al. |
| 5,060,476 A | | 10/1991 | Yamaguchi et al. |
| 5,063,897 A | | 11/1991 | Okui et al. |
| 5,108,267 A | | 4/1992 | Horst |
| 5,133,174 A | | 7/1992 | Parsons, Jr. |
| 5,179,921 A | * | 1/1993 | Figliuzzi ................. 123/198 C |
| 5,311,740 A | | 5/1994 | Shiba et al. |
| 5,325,650 A | | 7/1994 | Fuse et al. |
| 5,335,487 A | | 8/1994 | Murakawa et al. |
| 5,464,331 A | * | 11/1995 | Sawyer ..................... 417/364 |
| 5,517,809 A | | 5/1996 | Rich |
| 5,518,079 A | | 5/1996 | Zvolanek |
| 5,622,051 A | | 4/1997 | Iida et al. |
| 5,649,422 A | * | 7/1997 | Baginski et al. ............... 60/431 |
| 5,678,516 A | | 10/1997 | Sakurai |
| 5,701,739 A | | 12/1997 | Ohashi et al. |
| 5,782,616 A | * | 7/1998 | Yoo ........................... 417/364 |
| 5,876,188 A | * | 3/1999 | Okamoto .................... 417/364 |
| 5,916,139 A | * | 6/1999 | Tieben ....................... 60/413 |
| 5,918,449 A | | 7/1999 | Rush et al. |
| 5,997,260 A | * | 12/1999 | Genter et al. ............... 417/364 |
| 6,007,305 A | * | 12/1999 | Maloney et al. ............. 417/273 |
| 6,007,444 A | | 12/1999 | Kinokami |
| 6,119,552 A | | 9/2000 | Matsufuji |
| 6,125,961 A | | 10/2000 | Matsufuji |
| 6,148,787 A | | 11/2000 | Takano |
| 6,199,380 B1 | | 3/2001 | Ishii |
| 6,405,815 B1 | * | 6/2002 | Stoever et al. ............. 180/53.4 |

\* cited by examiner

ENGINE WITH INTEGRAL ACTUATOR

RELATE BACK

This application is a continuation-in-part of U.S. Ser. No. 09/618,697, filed Jul. 18, 2000, now U.S. Pat. No. 6,543,560, entitled "HYDROSTATIC TRANSMISSION WITH INTEGRAL ACTUATOR," which is incorporated herein by reference in its entirety.

TECHNICAL FIELD

The present invention relates to an engine for use in a vehicle having controlled accessories and, more particularly, the present invention relates to an engine with an integral actuator.

BACKGROUND OF THE INVENTION

It is well known to propel a vehicle with an internal combustion engine. Some vehicles include one or more mechanisms requiring control. Examples of vehicles including mechanisms needing control are garden tractors and riding lawn mowers. Examples of mechanisms of a lawn and garden tractor or a lawn mower needing control are the blades of a lawn mower, a snow thrower, or other implements powered by a power-take-off-shaft (PTO), adjusting the height of a mower deck, adjusting the height and angle of a snow blade, adjusting the height of a snow blower, power steering, raising a three point hitch and any connected attachments., and indicating how full a grass bag is.

U.S. Pat. No. 3,367,459 discloses a control mechanism for engaging and disengaging the implements of a powered vehicle. The control method disclosed by the '459 patent includes an idler pulley which is used to apply tension to a drive belt to disengage a cutter from the engine. U.S. Pat. No. 5,918,449 to Rush discloses a control system for engaging a PTO. The '449 patent utilizes a vacuum actuator to force an idler pulley into operative engagement with a PTO belt. U.S. Pat. No. 5,351,467 to Trefz et al. discloses an apparatus for suspending, raising, and lowering a cutting deck that is held beneath a riding lawn mower. The '467 patent discloses a foot pedal for use in adjusting the height of a cutting deck. U.S. Pat. No. 5,911,672 discloses a control system for controlling a device of a riding lawn mower. The system disclosed by the '672 patent utilizes a vacuum actuator having first and second chambers connected by a movable membrane. The system is used to secure a mower deck at a selected height.

DISCLOSURE OF THE INVENTION

The present invention concerns an engine with an integral actuator for a vehicle having an implement needing control. The engine with integral actuator includes an engine housing. A crank shaft is rotatably mounted in the engine housing. A pump is mounted in the engine housing and is operably connected to the crank shaft. Rotation of the crank shaft produces a flow of fluid from the pump. An actuator is mounted at least partially within the engine housing. The actuator includes an actuator portion that extends outside the engine housing. The actuator is coupled to the pump. A valve is operably connected to the pump or actuator to selectively communicate fluid pressure to the actuator to selectively extend and retract the actuator portion that extends from the engine housing.

In alternative embodiments of the invention, rotation of the crank shaft produces a flow of motor oil from the pump. Motor oil under pressure is selectively communicated to the pump or the actuator by the valve to selectively extend and retract the actuator portion. A spring is operably connected to the actuator that biases the actuator to a first position. The spring is disposed in a housing of the actuator. The valve is a solenoid valve that is enclosed in the engine housing.

The pump may be coupled to the crank shaft in several different ways. For example, the pump may be connected directly to the crank shaft. A gear that drives the pump may mesh with a gear on the crank shaft. The crank shaft may be coupled to a gear on a cam shaft which may be directly coupled to the pump. A gear that drives the pump may mesh with a gear on the cam shaft.

The engine with integral actuator selectively extends and retracts the integral actuator by rotating the crank shaft. The crank shaft is coupled to the pump to create a fluid pressure in the pump. The fluid pressure is selectively communicated from the pump to the integral actuator to selectively extend and retract the portion of the actuator that extends from the engine housing.

A control system for controlling a PTO shaft on a riding lawn mower includes an engine with an integral actuator. The engine includes a housing, a crank shaft rotatably mounted in the housing, a pump in the housing operably connected to the crank shaft and an actuator at least partially within the housing coupled to the pump. Rotation of the crank shaft produces a flow of fluid from the pump to the actuator. A valve is operably connected to the pump or the actuator to selectively communicate fluid pressure to the actuator to selectively move the actuator from a first position to a second position. A connector link is operably connected to the actuator and the PTO shaft. Movement of the actuator from the first position to the second position engages the PTO shaft.

Additional features of the invention will become apparent and a fuller understanding will be obtained by reading the following detailed description in connection with the accompanying drawings.

BEST MODE FOR CARRY OUT THE INVENTION

The present invention is directed to an engine 10 having an integral actuator 22 for a vehicle having a mechanism needing control. Referring to FIGS. 1A, 1B, 1C, 1D, the engine 10 having an integral actuator 22 includes an engine housing 14, a crank shaft 16, an actuator pump 20, a fluid driven actuator 22, and an actuator valve 24. The engine housing 14 is adapted for connection to the frame of a vehicle (not shown). The crank shaft 16 is rotatably mounted in the engine housing 14. The crank shaft 16 is coupled to a piston 17 by a connecting rod 18. The actuator pump 20 is disposed in the engine housing and is connected to the crank shaft 16. Rotation of the crank shaft 16 produces a flow of fluid from the actuator pump 20. In the exemplary embodiment, the fluid driven actuator 22 is at least partially contained within the engine housing 14 and is coupled to the actuator pump 20. In the illustrated embodiment, the actuator valve 24 is interposed between the actuator pump 20 and the fluid driven actuator 22 for selectively extending and retracting the actuator 22. In an alternate embodiment, the actuator 22 is coupled directly to the pump by a line and a pressure relieving valve is coupled to the actuator.

Referring to FIGS. 1A, 1B, 1C, 1D, the engine housing 14 includes an upper portion 30 and a lower portion 32. The lower portion 32 of the engine housing is fluid tight. The volume defined by the walls 34 of the lower portion 32 of the engine housing 14 define a pan or reservoir 36 that contains engine lubricating oil 38. Referring to FIGS. 1A, 1B, 1C, 1D, the upper portion 30 of the engine housing 14 is connected to the lower portion 32 to form a sealed engine housing 14.

In the illustrated embodiment, a wall 34 of the lower portion 32 includes an opening 48 for the fluid driven actuator 22. In one embodiment, the opening 48 for the actuator 22 is in the upper portion 30 of the engine housing 14. The opening 48 for the actuator is sized to accommodate a body 52 of the actuator 22 (or a portion 53 of the body 52 as depicted in FIGS. 1A, 1B, 1C, 1D). In an alternate embodiment, the opening 48 for the actuator 22 is sized to fit around an actuator shaft 54. A seal is formed around the portion of the actuator that extends through the openings 48 in the engine housing 14. The seal around the portion of the actuator that extends through the housing 14 prevents oil from leaking out of the housing and prevents contaminants from entering the housing.

Figure 1A:
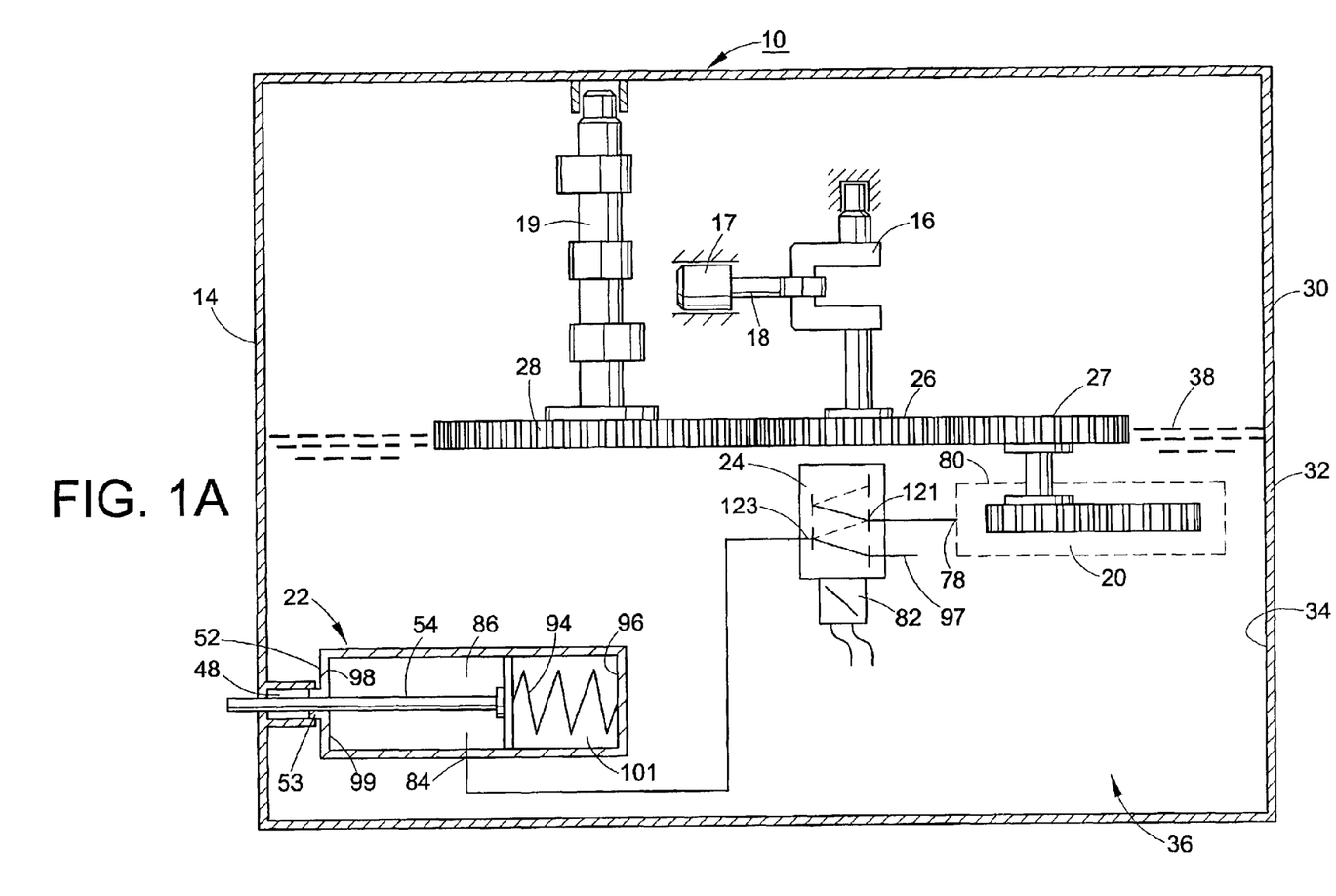
FIG. 1A is a schematic representation of an engine with an integral actuator of one embodiment.
Figure 1B:
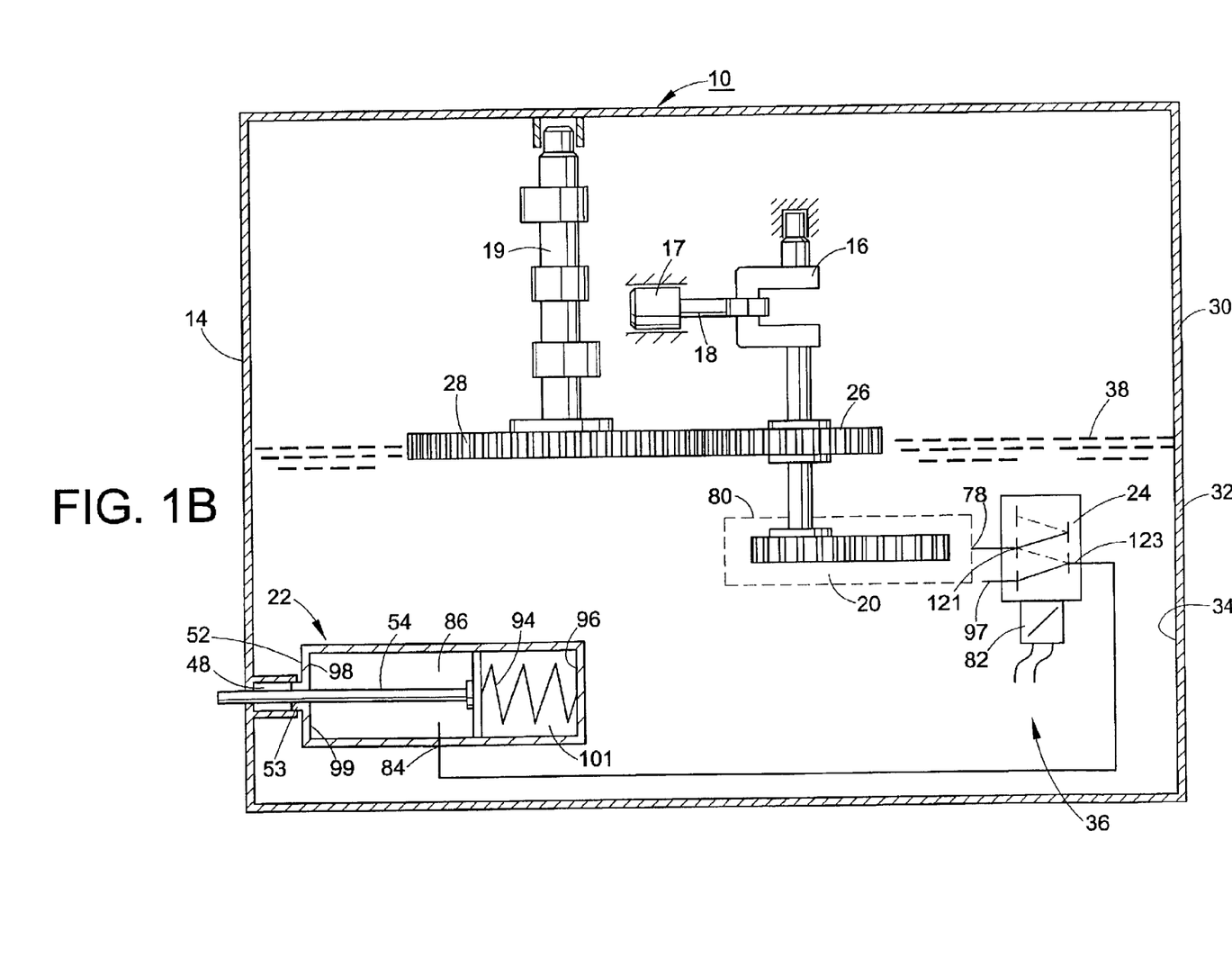
FIG. 1B is a schematic representation of an engine with an integral actuator of one embodiment.
Figure 1C:
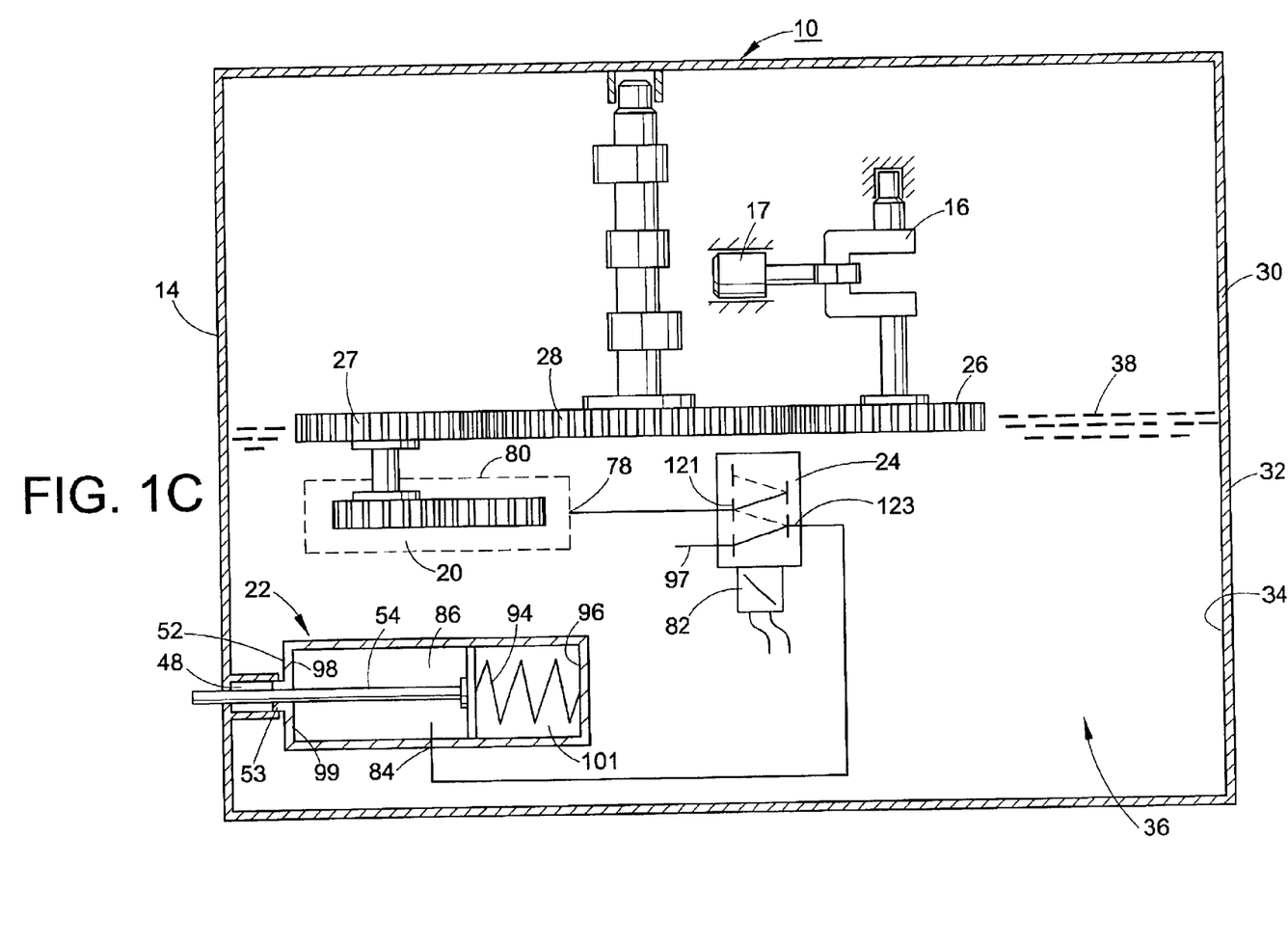
FIG. 1C is a schematic representation of an engine with an integral actuator of one embodiment.
Figure 1D:
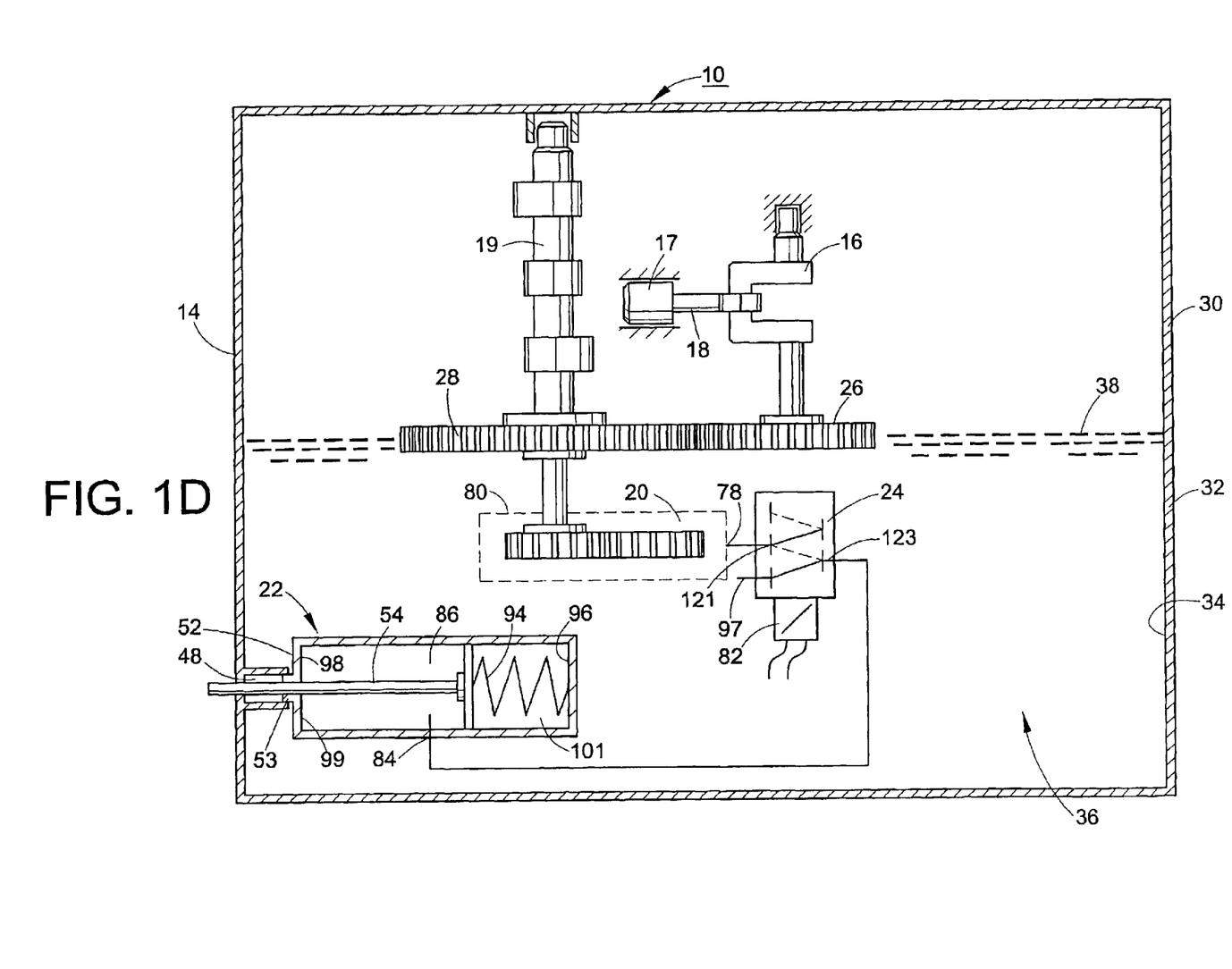
FIG. 1D is a schematic representation of an engine with an integral actuator of one embodiment.
Figure 2:
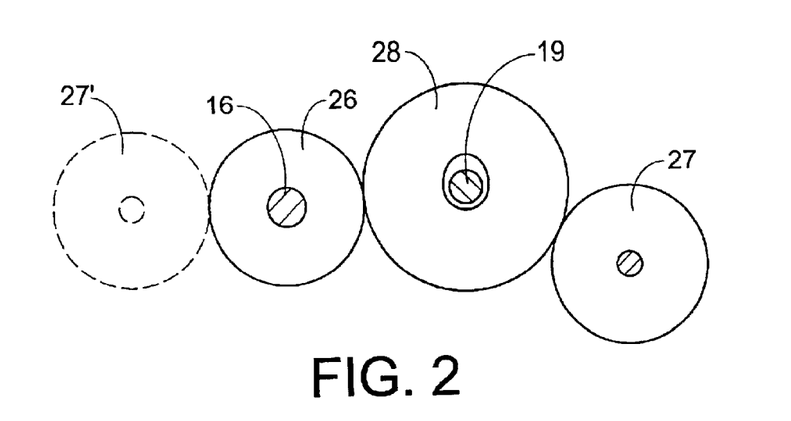
FIG. 2 is a schematic representation of a gear driven by a crank shaft, a gear driven by a cam shaft, and a gear that drives an oil pump.
Figure 3:
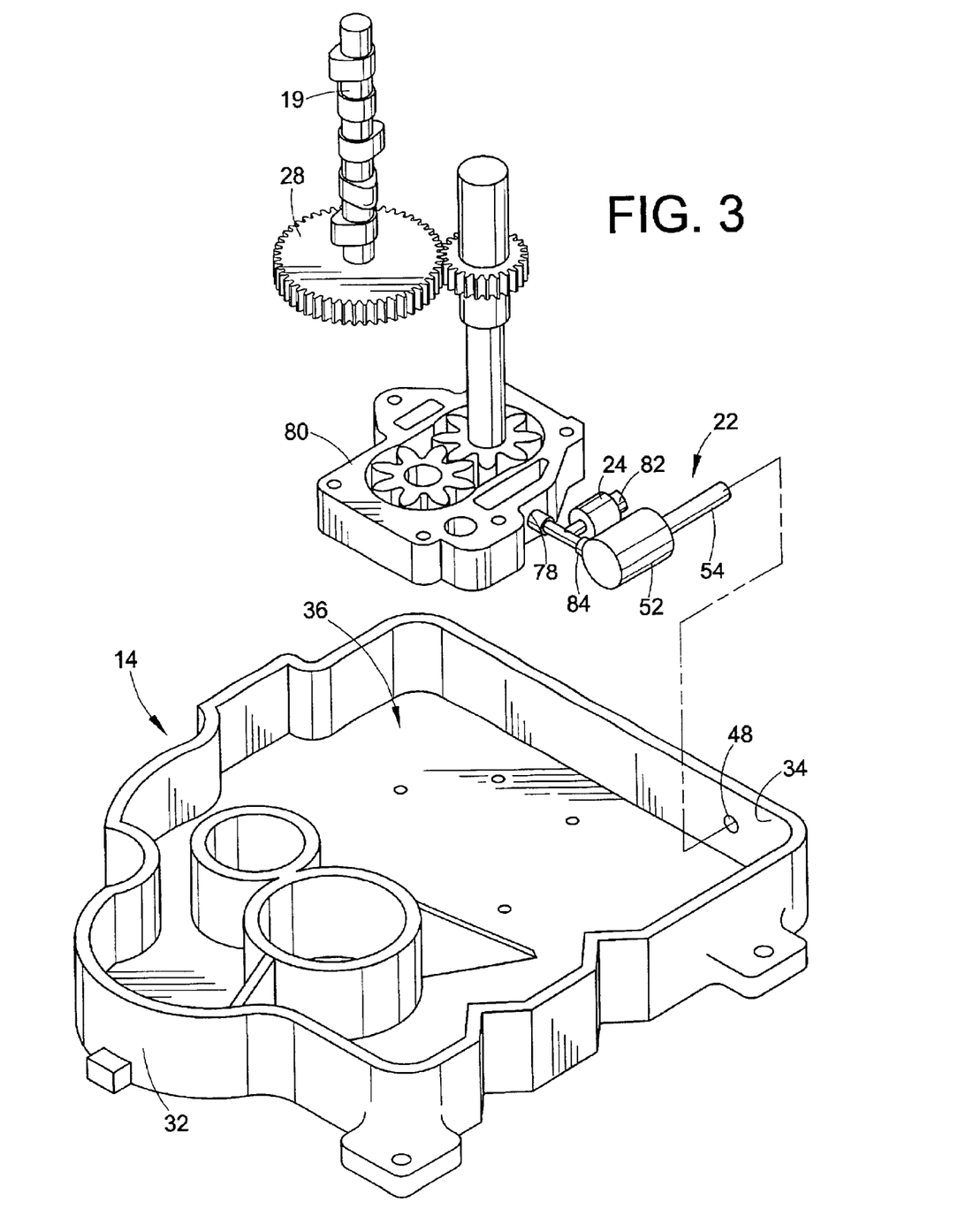
FIG. 3 is a perspective view of an oil pump and actuator coupled to a cam shaft.
Figure 4:
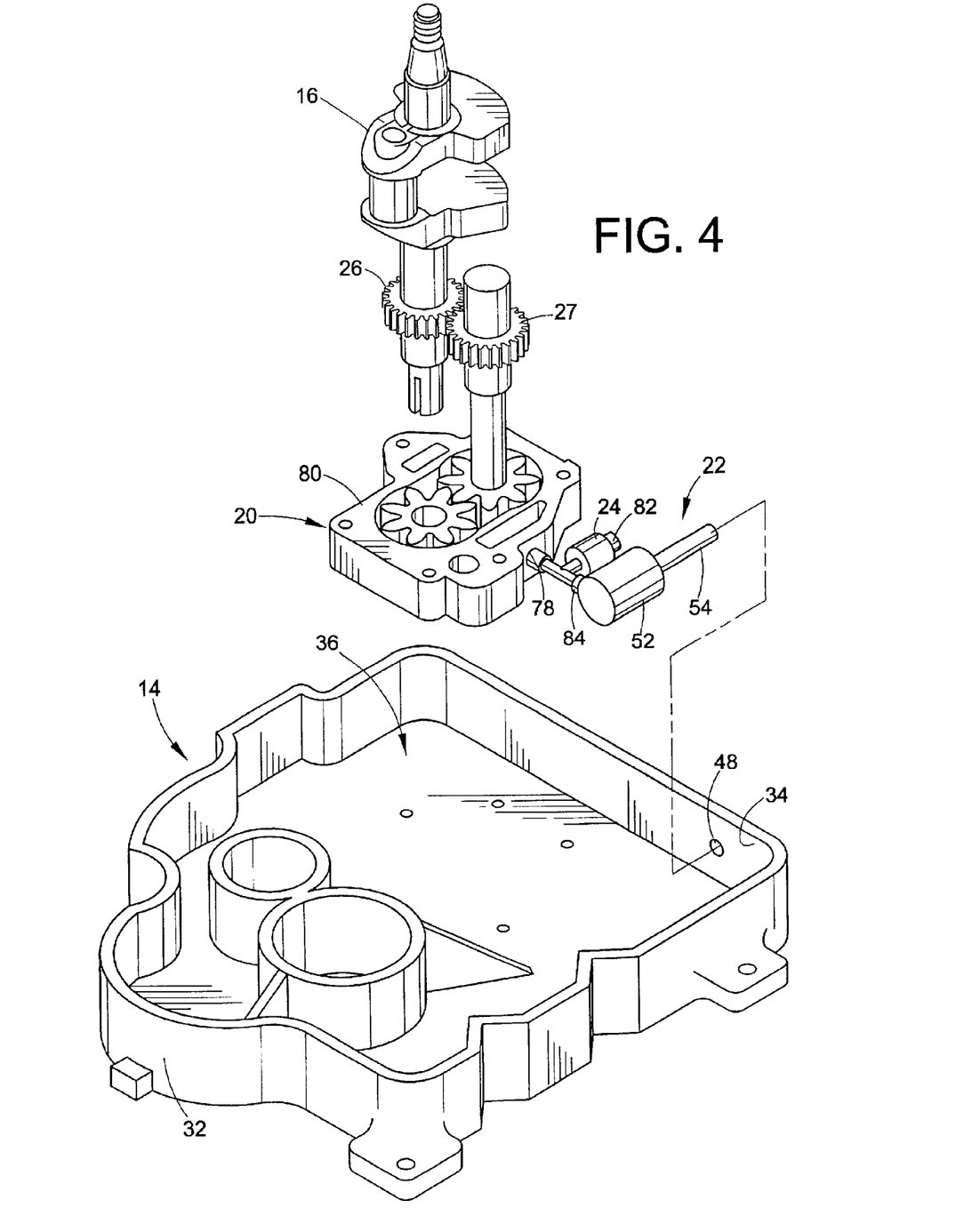
FIG. 4 is a perspective view of an oil pump and actuator coupled to a crank shaft.

Referring to FIGS. 1A, 1B, 1C, 1D, 2, 3, and 4, the actuator pump 20 may be coupled to the crank shaft 16 in several different ways. Referring to FIGS. 1A, 1B and 4, the pump 20 may be coupled directly to the crank shaft 16. In the embodiment illustrated by FIGS. 1A, 1B. 1C, 1D, a gear 26 on the crank shaft 16 meshes with a gear 27 that drives the pump 20. In the embodiment illustrated by FIGS. 1A, 1B, 1C, 1D, the crank shaft 16 is extended into the pump housing 21 to drive the pump directly.

Referring to FIGS. 1C, 1D, 2 and 3, the pump may be coupled to a cam shaft 19. In the illustrated embodiment, the can shaft 19 is rotatably mounted in the engine housing 14. The cam shaft 19 includes a gear 28 that meshes with the fear 26 on the crank shaft 16. In the embodiment illustrated by FIGS. 1C and 3, the gear 28 on the cam shaft meshes with the gear 27 that drives the pump 20. In the embodiment illustrated by FIGS. 1A, 1B, 1C, 1D, the cam shaft 19 is extended into the pump housing to drive the pump housing 21 to drive the pump directly.

One existing engine that may be modified in accordance with the present invention is model no. 35077 produced by Briggs and Stratton. The lower portion 32 of the engine housing 14 of the exemplary embodiment is larger than the unmodified engine housing 14, accommodating the actuator pump 20 valve and actuator. It should be readily apparent to those skilled in the art that any suitable engine housing may be modified to construct an engine with integral actuator of the present invention. In the exemplary embodiment, the actuator pump 20 is submerged in the oil 38 in the pan or reservoir 36.

In one embodiment, an engine having an oil pump for lubrication is modified in accordance with the present invention. In one embodiment, the lubrication pump is modified to supply lubrication oil to the moving parts of the engine and provide oil under pressure to the actuator. The lubrication oil pumps of engines for lawn mowers and lawn and garden tractors generally provide between 15 and 40 psi of pressure, which is low for the actuator. The displacement and pressure of the lubrication pump are increased to accommodate the integral actuator. In addition, passages to the solenoid valve and cylinder would be incorporated in the oil pump. Larger engines from Briggs & Stratton, Tecumseh, Kohler, Honda and Kawasaki include lubrication oil pumps. The oil pumps of these engines can be modified in accordance with this embodiment.

In the embodiment illustrated by FIGS. 1A, 1B, 1C, 1D, the engine 14 with integral actuator 22 includes a pump 20 that is dedicated to the actuator. The pump 20 can be added to an engine having a lubrication pump, an engine having a splash oil lubrication system, or an engine with a low pressure lubricating pump. All engine types can be modified to incorporate an integral actuator when a pump dedicated to the actuator is included.

Figure 7A:
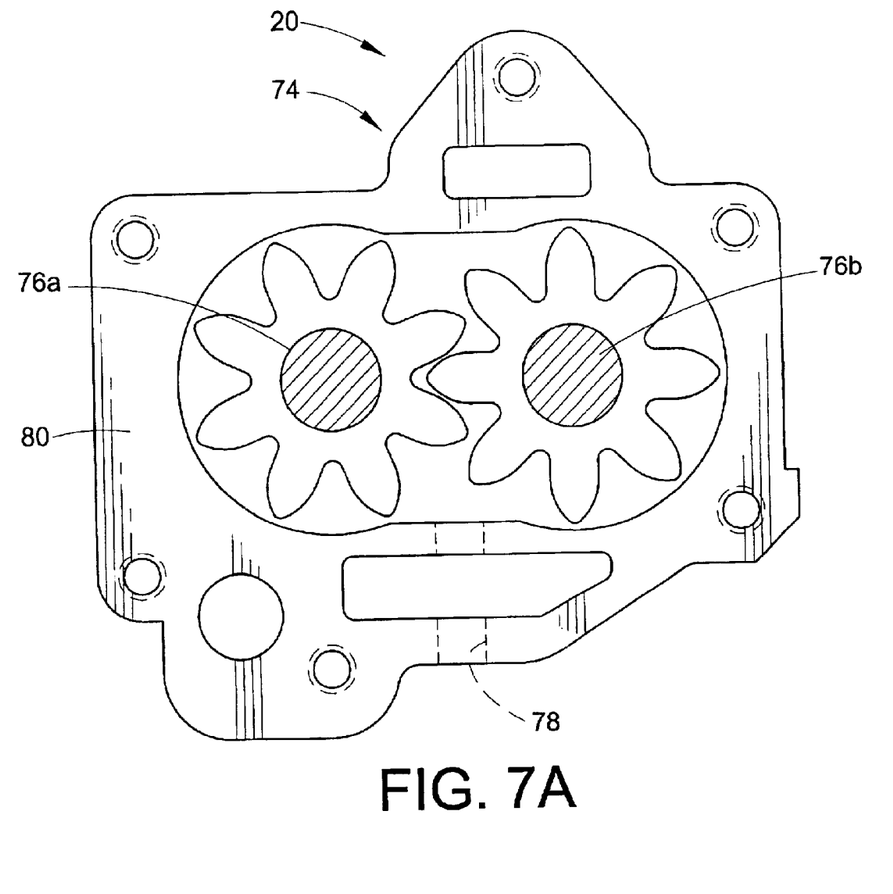
FIG. 7A is a top plan view of a gear pump.
Figure 7B:
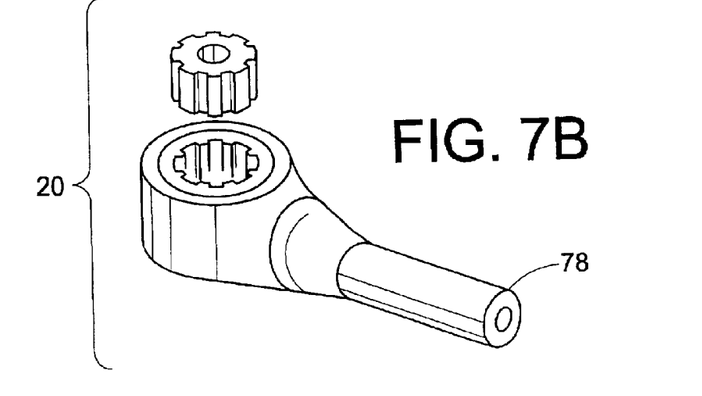
FIG. 7B is a perspective view of a gerotor pump.

The pump illustrated by FIG. 7A is a gear pump 74 (shown without a cover). The gear pump 74 includes two gears 76a, 76b. Gear 76a is operably coupled to the crank shaft 16 and gear 76b is an idler gear that freely rotates. Rotation of gears 76a, 76b by the crank shaft 16 produces a flow of fluid from an outlet 78 of the gear pump 74. The pump illustrated by FIG. 7B is a gerotor pump 75. In one embodiment of the invention, the pump produces a flow of fluid out the outlet 78 at a pressure of approximately 45 psi.

Since the actuator pump 20 is submerged in the oil 38 in the pan or reservoir 36, it is not necessary for a housing 80 of the actuator pump 20 to be fluid tight. In the exemplary embodiment, the pump is made from plastic to reduce the cost of the pump. The gerotor pump may be made of steel or another metal to strengthen the pump. One suitable gerotor pump is model #693186 manufactured by Briggs and Stratton. It should be apparent to those skilled in the art that other pumps could be used as the actuator pump 20. For example, a gear pump (shown in FIGS. 4 and 7A) or vane pump could be used.

In the exemplary embodiment, the outlet 78 of the actuator pump 20 is coupled to the actuator valve 24. In the exemplary embodiment, the actuator valve 24 is a solenoid valve. Application of an electric signal to the solenoid 82 causes the valve 24 to open, thereby communicating engine oil 38 under pressure to the fluid driven actuator 22.

Figure 5:
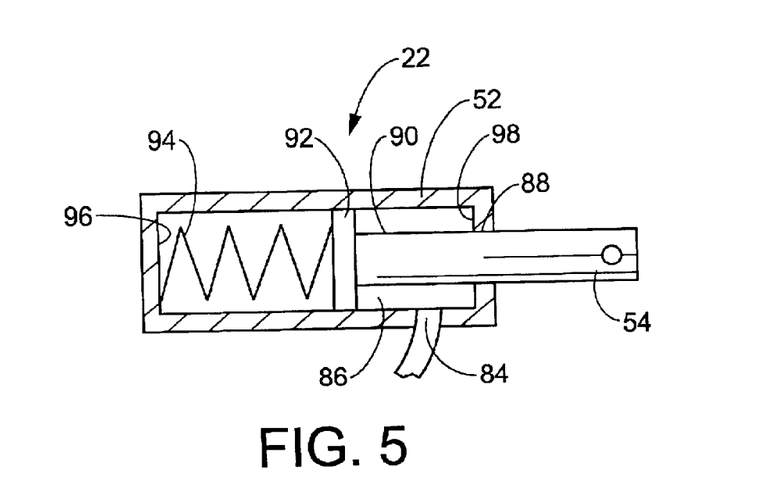
FIG. 5 is an enlarged schematic representation of an actuator shown in extended position.
Figure 6:
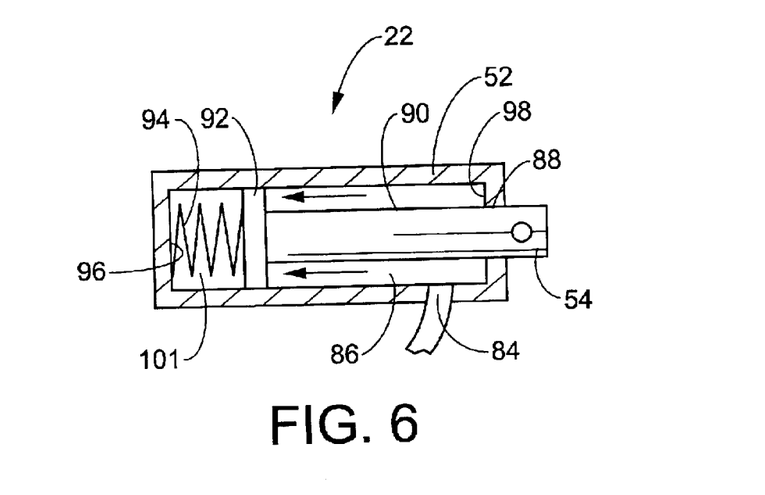
FIG. 6 is an enlarged schematic representation of an actuator shown in a retracted position.

Referring to FIGS. 1A, 1B, 1C, 1D, the fluid driven actuator 22 is supported within the opening 48 in the lower portion 32 of the engine housing 14. An inlet 84 into a chamber 86 of the fluid driven actuator 22 routes fluid into the chamber based on the state of the actuator valve 24. Referring to FIGS. 5 and 6, the shaft 54 of the actuator 22 extends through an opening 88 in the body 52 of the actuator into the chamber 86 of the actuator. An internal end 90 of the shaft 54 is connected to a piston head 92. A compression actuator spring 94 is captured between the piston head 92 and an end wall 96 of the chamber 86. The compression actuator spring biases the actuator to an extended position shown in FIG. 6, when hydrostatic fluid under pressure is not communicated to the actuator Referring to FIGS. 1 and 6, when the actuator valve 24 is "open" (indicated by dotted lines in FIGS. 1A, 1B, 1C, 1D) the pump 20 is coupled to the actuator. Oil 38 under pressure enters a region 99 of the chamber 86 that bounds the shaft 54 in the actuator body 52. The oil under pressure 38 exerts force against the piston head moves the shaft 54 into the body 52 against the biasing force of the compression actuator spring 94. Once the actuator 22 is full of oil, a relief valve (not shown) opens at approximately 45–50 psi allowing oil to leave the pump 20. In an alternate embodiment, a relief valve is not included because the pump is constructed such that oil can "leak" out of the pump when a designated pressure within the pump housing is reached.

Referring to FIGS. 1 and 5, when the valve is "closed" hydrostatic fluid under pressure is not communicated to the chamber 86 of the actuator body 52. When the valve is in the "closed" position (indicated by solid lines in FIGS. 1A, 1B, 1C, 1D), flow of oil from the actuator pump 20 that is used to extend or retract the actuator is stopped. When a lubrication pump is modified to supply oil to the actuator, the pump continues to supply lubricating oil when the valve is in the closed position. When a separate oil pump is used to extend or retract the actuator, the pump is coupled to the oil pan by the valve 24 when the valve is closed or the pump 20 includes a separate relief valve (not shown) that open when the valve 34 is "closed." The compression actuator spring 94 forces the piston head 92 and actuator shaft to the extended position. The movement of the piston head 92 in the chamber 96 of the actuator body 52 forces oil 38 out of the inlet 84 of the actuator. The oil 38 back flows to the valve and through the line 97, which is open to the reservoir or pan 36 when the valve is "closed," into the reservoir or pan 36. The flow of oil 38 from the actuator 22 to the reservoir 36 is due to the construction of the valve 24. In the exemplary embodiment, the inlet 121 and outlet 123 of the valve in the "closed" position are closed to one another, the outlet is open to the reservoir and the inlet is closed. The inlet 121 and outlet 123 of the valve in the "open" position are open to one another and are closed to the reservoir. One acceptable valve is Model Number GT0233 produced by Sterling Hydraulics. It should be readily apparent to those skilled in the art that the illustrated valve can be replaced with individual single pole valves. For example, a first single pole valve may selectively couple the pump to the actuator. A second single pole valve may selectively couple the actuator to the reservoir. A third single pole valve may selectively couple the pump to the actuator.

It should also be apparent to those skilled in the art that the fluid driven actuator can be configured such that oil under pressure to the actuator 22 will cause the fluid actuator to extend from a normally retracted position. For example, the compression actuator spring may be disposed around the shaft 54 of the actuator, between the piston head 92 and the opposite end wall 98 of the chamber 86. The hydrostatic inlet 84 in this embodiment is located near the end wall 96 of the chamber 86. In this embodiment, the spring biases the shaft to a retracted position when the valve 24 is "closed" and oil 38 under pressure is not supplied to the actuator. When the valve is opened, hydrostatic fluid under pressure is supplied to a region 101 of the chamber 86 that does not bound the shaft 54 in the actuator body 52. The fluid under pressure exerts a force on the piston head pushing actuator shaft 54 out the actuator opening 88 against the force of the spring to an extended position.

It should also be apparent to those skilled in the art that an extension spring may be used to bias the actuator. Alternatively, the actuator may include a first inlet in the shaft side 99 of the chamber 86 and a second inlet (not shown) in the piston side 101 of the chamber 86. Regulation of the fluid under pressure to the first and second inlets allows the piston head 92 and actuator shaft to be stopped at various locations between the fully extended position shown in FIG. 5 and the retracted position shown in FIG. 6.

In the exemplary embodiment, the integral actuator is selectively extended and retracted by rotating the crank shaft 16 of the engine 12. The crank shaft of the engine is coupled to the actuator pump 20 to create fluid pressure in the pump. An electrical signal is provided to the solenoid 82 to open the valve 24 to communicate oil 38 under pressure from the pump 20 to the actuator to retract the actuator. By removing the electrical signal from the solenoid 82, the valve 24 "closes" to stop the flow of hydrostatic fluid 38 under pressure from the actuator pump 20 to the fluid driven actuator. Removal of the electric signal from the solenoid 82 also opens the outlet of the pump 78 and the inlet 84 of the actuator 22 to the reservoir or pan 36, allowing oil 38 in the chamber 86 of the actuator 22 to evacuate into the reservoir or pan. This allows the actuator to retract very quickly under the biasing force of the compression actuator spring 94.

The integral actuator 22 of the engine can be used to engage and disengage a variety of implements of a vehicle. The integral actuator could be used on a walk behind mower to engage the blade. The actuator could be used on a rototiller to engage the tines. It can be used on a lawn and garden tractor to control a variety of implements. For example, the integral actuator 22 can be used for engaging blades of a mower deck, engaging a power take-off, adjusting the height of a mower deck, adjusting the angle of a snow plow blade, lifting a snow plow blade, adjusting the blower spout angle of a snow blower, raising a snow blower, power steering, emptying a grass catcher, raising a 3 point hitch and any connected attachments, controlling the speed of the tractor, indicating how full a grass bag is, applying brakes, adjusting the suspension, adjusting the seat, assisting gear shifting and providing an interlock when a mower is in reverse. The engine 14 may have more than one actuator to control more than one implement.

Figure 8:
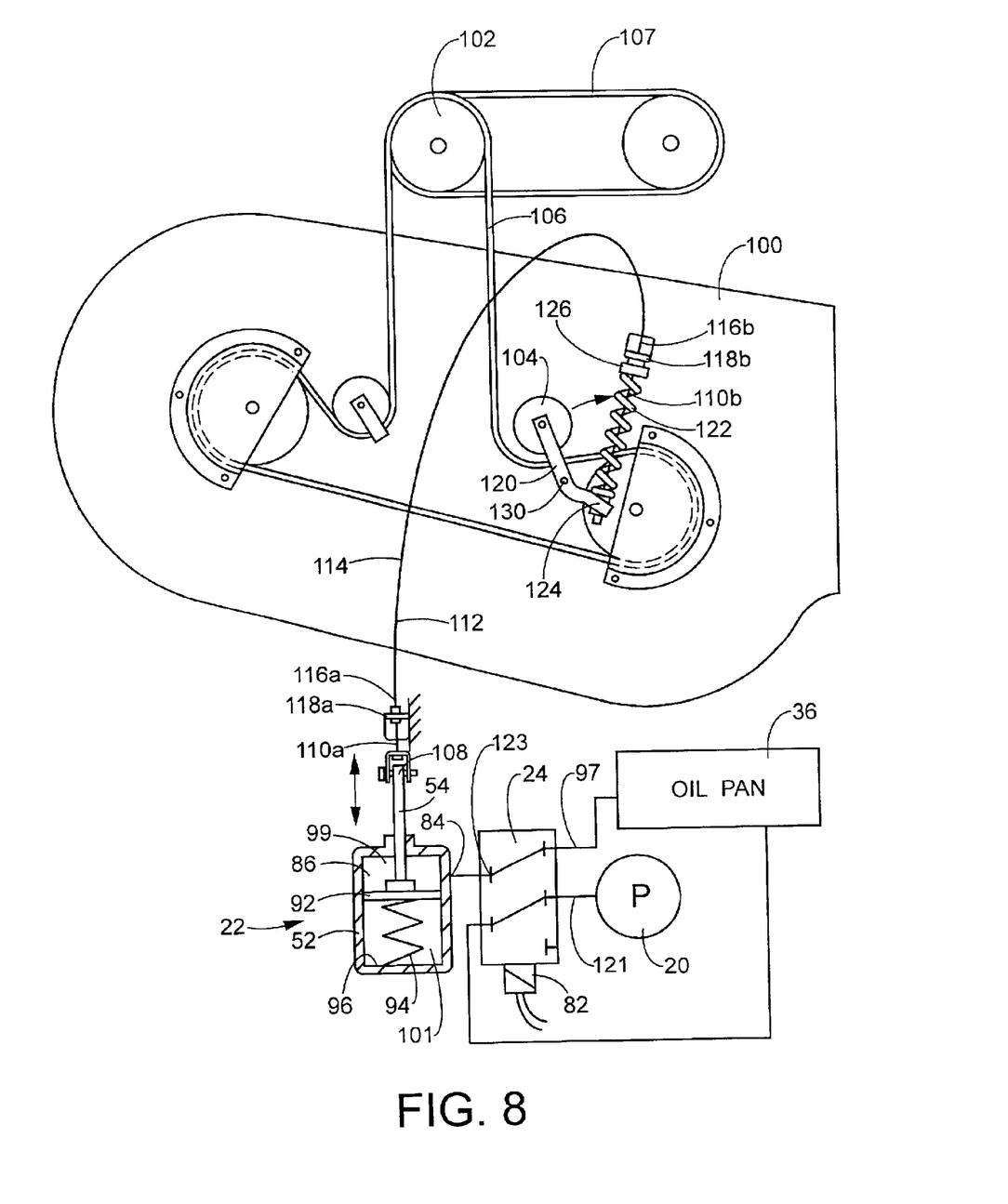
FIG. 8 is a schematic representation of an engine having an integral actuator disengaging a power take-off of a lawn and garden tractor; and, FIG. 9 is a schematic representation of an engine having an integral actuator engaging a power take-off of a lawn and garden tractor.
Figure 9:
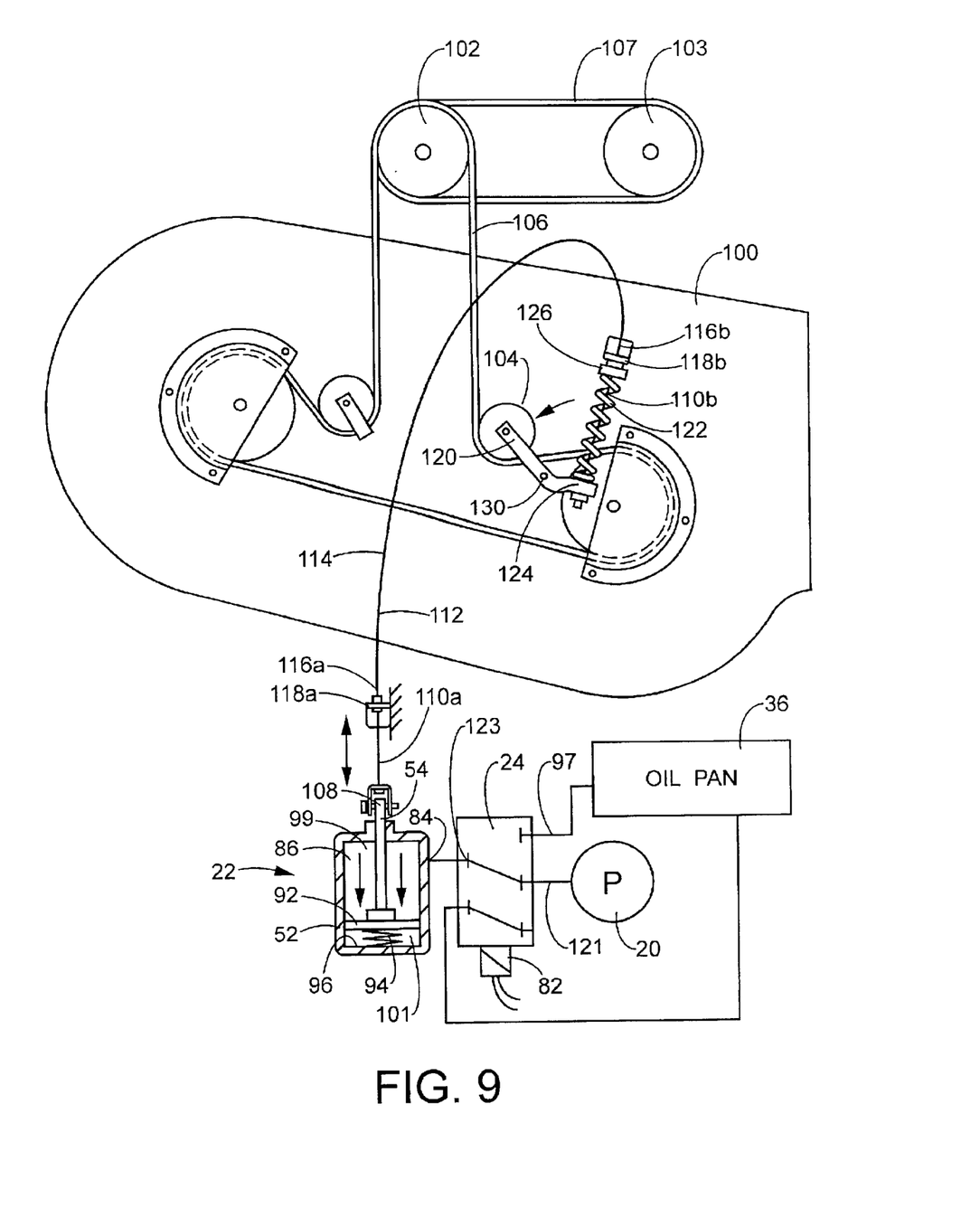

By way of example, FIGS. 8 and 9 depict the engagement of a belt 106 of a mower deck 100 to a power take-off 102. The power take off 102 is coupled to an output shaft 103 of the vehicle engine 12 with a belt 107. FIG. 8 shows the fluid driven actuator 22 biased by the compression actuator spring 94 to an extended position, allowing slack between an idler pulley 104 and the belt 106. In FIG. 8, an electrical signal is not being communicated to the solenoid 82, so the valve 24 operably connects the inlet 84 of the fluid driven actuator 22 to the reservoir 36. Since fluid under pressure is not pressing against the piston head 92, the compression actuator spring 94 biases the actuator shaft 54 to the extended position. An end 108 of the actuator shaft 54 is coupled to an end 110a of a cable 112. A sleeve 114 having two ends 116a, 116b is disposed around all but an exposed end of the cable. The sleeve ends 116a, 116b are connected to anchors 118a, 118b. The anchor 118a is connected to the frame of the vehicle or tractor and the anchor 118b is mechanically fastened to the mower deck 100. The second end 110b of the cable 112 is connected to a pivotable arm 120 that moves the idler pulley 104 into and out of engagement with the belt 106. A compression spring 122 is disposed around the cable end 110b and is "sandwiched" between an end 124 of the pivotable arm 120 and a stop 126.

When the fluid driven actuator 22 is in the extended position shown in FIG. 8, the compression spring 122, "sandwiched" between the pivotable arm 20 and stop, forces the pivotable arm 20 away from the stop 26 (clockwise in FIG. 8) maintaining tension on the cable 112. By pushing the pivotable arm 120 away from the stop 126, the compression spring pivots the idler pulley 104 away from the belt 106 to disengage the belt from the power take-off.

Referring to FIG. 9, an electric signal is applied to the solenoid 82 to open the actuator valve 24. Fluid pressure is communicated from the actuator pump 20 to the inlet 84 of the fluid driven actuator 22. Oil under pressure enters the actuator chamber 86 and forces the piston head, against biasing force of the compression actuator spring 94 to retract the shaft 54 of the actuator and the cable 112. As the actuator shaft 54 pulls on the cable 112, the pivotable arm 120 is pulled toward the stop 126 against the force of the idler compression spring 122. The effective length of the compression spring 122 is reduced and the idler pulley 104 is rotated about a pivot 130 (in a counterclockwise sense in FIG. 8) into engage the belt 106. Tight engagement between the idler pulley 104 and the belt 106 effectively couples the mower deck 100 to the power take-off to rotate blocks (not shown) coupled to two driver pulleys 107a, 107b.

Although the present invention has been described with a degree of particularity, it is the intent that the invention include all modifications and alterations falling within the spirit and scope of the appended claims.

We claim:

1. An engine with an integral actuator for a vehicle, comprising:
    a) an engine housing;
    b) a crank shaft rotatably mounted in said engine housing;
    c) a pump mounted in said engine housing operably connected to said crank shaft, wherein rotation of said crank shaft produces a flow of fluid from said pump;
    d) an actuator at least partially within said engine housing including an actuator portion that extends outside the engine housing coupled to said pump; and,
    e) a valve operably connected to one of said pump and said actuator for selectively communicating fluid pressure to said actuator to selectively move said actuator portion.

2. The apparatus of claim 1 wherein rotation of said crank shaft produces a flow of motor oil from said pump that is selectively communicated to one of said pump and said actuator by said valve.

3. The apparatus of claim 1 further comprising a spring operably connected to said actuator that biases said actuator to a first position.

4. The apparatus of claim 1 wherein said valve is enclosed in said engine housing.

5. The apparatus of claim 1 wherein said valve comprises a solenoid valve.

6. The apparatus of claim 1 further comprising a spring disposed in a housing of said actuator that biases said actuator to a first position.

7. The apparatus of claim 1 wherein said pump is operably connected to a cam shaft that is operably connected to said crank shaft.

8. The apparatus of claim 1 wherein said pump is connected directly to said crank shaft.

9. The apparatus of claim 1 further comprising a gear on said crank shaft coupled to a gear that drives said pump.

10. The apparatus of claim 1 further comprising a gear on said crank shaft coupled to a gear on a camshaft, said gear on said camshaft coupled to a gear that drives said pump.

11. The apparatus of claim 1 further comprising a gear on said crank shaft coupled to a gear on a camshaft, said pump being connected directly to said camshaft.

12. A method of selectively extending and retracting an integral actuator contained at least partially within an engine housing comprising:
    a) rotating a crank shaft of an engine;
    b) coupling said crank shaft of said engine to a pump positioned within a housing of said engine to create fluid pressure in said pump; and,
    c) selectively communicating said fluid pressure from the pump to an integral actuator to selectively extend and retract a portion of said actuator that extends from said housing.

13. The method of claim 12 wherein oil under pressure is selectively communicated from said pump to said integral actuator.

14. The method of claim 12 further comprising biasing said integral actuator to a first position with a spring.

15. The method of claim 12 wherein selectively communicating pressure comprises opening a valve to communicate fluid pressure from said pump to said actuator.

16. The method of claim 15 wherein an electric signal is communicated to said valve to open said valve.

17. The method of claim 12 wherein said integral actuator is extended by communicating fluid pressure to said integral actuator.

18. The method of claim 12 wherein the integral actuator is retracted by communicating fluid pressure to the integral actuator.

19. The method of claim 12 wherein coupling said crank shaft to said pump comprises connecting said pump directly to said crank shaft.

20. The method of claim 12 wherein coupling said crank shaft to said pump comprises coupling a gear on said crank shaft to a gear that drives said pump.

21. The method of claim 12 wherein coupling said crank shaft to said pump comprises coupling a gear on said crank shaft to a gear on said camshaft and coupling said camshaft to said pump.

22. The method of claim 12 wherein coupling said crank shaft to said pump comprises coupling a gear on said crank shaft to a gear on a camshaft and coupling said gear on said camshaft to a gear that drives said pump.

23. An engine with an integral actuator, comprising:
    a) an engine housing;
    b) a crank shaft in said housing;
    c) a pump in said housing operably connected to said crank shaft, wherein rotation of said shaft produces a flow of motor oil from said pump;
    d) an actuator supported by said housing coupled to said pump; and,
    e) a valve operably connected to one of said pump and said actuator for selectively communicating motor oil under pressure to said actuator to selectively extend and retract said actuator.

24. An engine with an integral actuator, comprising:
    a) an engine housing;
    b) a crank shaft rotatably mounted in said housing;
    c) a first gear on said crank shaft;

d) a camshaft rotatably mounted in said housing:
e) a second gear on said camshaft coupled to said first gear;
f) a pump mounted in said housing;
g) a drive gear connected to a pump shaft that drives said pump, said drive gear being coupled to one of said first and second gears;
h) an actuator disposed within said housing coupled to said pump, said actuator including an actuator shaft that extends from said housing;
i) a first valve selectively coupling a chamber of said actuator to one of an oil pan portion of said housing and said pump; and,
j) a second valve selectively coupling said pump to said oil pan.

25. The apparatus of claim 24 wherein said first valve is coupled to said oil pan when said second valve is closed.

26. The apparatus of claim 24 wherein said first and second valves are included in a 2/3 way valve.

* * * * *